Feb. 12, 1935. J. H. BLANKENBUEHLER 1,991,074
CONTROL FOR INTERNAL COMBUSTION ENGINES
Filed Nov. 11, 1933 3 Sheets-Sheet 1

WITNESSES:
E. A. McCloskey
R. R. Lockwood

INVENTOR
John H. Blankenbuehler.
BY G. M. Crawford
ATTORNEY

Feb. 12, 1935.  J. H. BLANKENBUEHLER  1,991,074
CONTROL FOR INTERNAL COMBUSTION ENGINES
Filed Nov. 11, 1933  3 Sheets-Sheet 2

WITNESSES:  
E. A. M'Closkey  
R R Lockwood

INVENTOR  
John H. Blankenbuehler.

ATTORNEY

INVENTOR
John H. Blankenbuehler.

Patented Feb. 12, 1935

1,991,074

UNITED STATES PATENT OFFICE 1,991,074

CONTROL FOR INTERNAL COMBUSTION ENGINES

John H. Blankenbuehler, Edgewood, Pa., assignor to Westinghouse Electric & Manufacturing Company, East Pittsburgh, Pa., a corporation of Pennsylvania Application November 11, 1933, Serial No. 697,597

14 Claims. (Cl. 219—8)

My invention relates generally to internal-combustion engines and it has particular relation to the control of such engines when used to drive electric generators.

This invention constitutes an improvement on the internal-combustion-engine speed controller disclosed in my copending patent application, Serial No. 627,791, filed August 6, 1932, and assigned to the assignee of this application.

Ordinarily the manufacturer of electric generators, such as arc-welding generators, which are driven by internal-combustion engines, does not make the engine himself but rather purchases it from a builder who specializes in this particular type of apparatus. Such engine builders are thus ordinarily better fitted to furnish this type of apparatus, and generally it is more economical for them to do so. In many instances a certain particular type or make of engine is specified by a customer and for this further reason it is ordinarily impractical for the manufacturer of the welding generator to manufacture the engine which is specified.

The engines which may be purchased on the market for driving generators and the like are usually provided with a single throttle valve in the fuel inlet pipe. This throttle valve is ordinarily connected to a mechanical governor which is responsive to the speed of the engine for so controlling the position of the throttle valve as to maintain the engine within a predetermined range of operating speed regardless of the amount of load which is driven by the engine. Thus, whether the engine is operating under full load or is driving a very light load or is operating under no-load conditions, the speed of the engine is maintained substantially constant by the governor.

In certain instances it has been found desirable to reduce the speed of the engine from the operating speed to idling speed after the load has been removed from the generator, and, therefore, from the engine. A reduction in speed is especially desirable where the load is intermittently applied to the engine, such as in arc welding, and where the engine would be operating at no-load for a considerable period. It is not only desirable to reduce the speed of the engine to idling speed after the load is removed, but it is also desirable to effect this reduction in speed from the operating speed to the idling speed only after the expiration of a predetermined time interval in order to avoid which is commonly known as "hunting" of the engine between these two speeds.

When it is desired to incorporate an idling device in an internal-combustion engine which will be effective to reduce the engine speed to idling speed, it has heretofore been necessary to provide a second control valve in the fuel inlet pipe to the engine. The idling device is connected to control the operation of the second control valve independently of the control of the other valve by the governor.

It often happens that it is very inconvenient or difficult to provide a second control valve in the fuel inlet pipe. Moreover, certain systems of carburization require that only a single throttle valve be used in order to obtain proper operation of the engine. It is, therefore, desirable to provide for connecting the idling device to control either directly or indirectly the operation of a single throttle valve which may also be controlled by the governor while load is applied.

It is, therefore, the object of my invention, generally stated, to provide an idling device for controlling the operation of a governor-controlled throttle valve which shall be simple and efficient in operation and which may be readily and economically manufactured and installed.

The principal object of my invention is to provide for suitably controlling a single throttle valve located in a fuel inlet pipe to an internal-combustion engine in both the operating and idling speed ranges.

It is also an object of my invention to provide for rendering ineffective the load-responsive governor of an internal-combustion engine and to reduce the speed of the engine from operating speed to idling speed on removal of load.

Other objects of my invention will, in part, be obvious and, in part, appear hereinafter.

My invention accordingly is disclosed in the embodiments hereof shown in the accompanying drawings and comprises the features of construction, combination of elements, and arrangement of parts which will be exemplified in the construction hereinafter set forth, and the scope of the application of which will be indicated in the appended claims.

For a more complete understanding of the nature and scope of my invention, reference may be had to the following detailed description taken in connection with the accompanying drawings, in which.

Figures 1, 2:
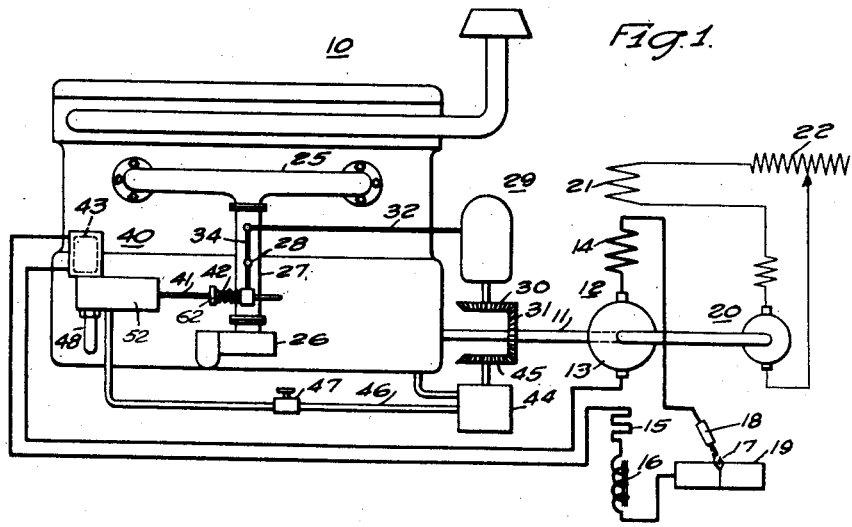
Figure 1 is a diagrammatic view illustrating a concrete embodiment of my invention.
Fig. 2 is an enlarged sectional view showing the details of construction of the aforesaid embodiment of my invention for controlling the speed of the engine shown in Fig. 1.

Referring now particularly to Fig. 1 of the drawings, the reference character 10 designates, generally, an internal-combustion engine which is connected by means of a shaft 11 to drive a generator, shown generally at 12, which may be used for supplying current to perform an arc-welding operation. The construction of both the engine 10 and the generator 12 may be such as are well known to those skilled in the art, and, therefore, a detailed description thereof will not be set forth in this application.

The generator 12 is preferably of the differential compound type having an armature 13 connected in series-circuit relation with a differential series field winding 14, and is connected to supply current through a resistor 15 and inductor 16 to maintain an arc 17 between a welding electrode 18 and work 19 on which the welding operation is to be performed. An exciter generator, shown generally at 20, may be provided on the shaft 11 to supply current for energizing a main field winding 21 of the generator 12 through a suitable variable resistor 22.

As illustrated, the engine 10 is provided with the customary intake manifold 25 and a carburetor 26 which are connected together by means of a riser 27. A single throttle valve 28, more clearly shown in Figs. 2 and 3 of the drawings, is pivotally mounted within the riser 27, which forms the fuel inlet pipe to the engine, for controlling the flow of fuel therethrough.

In order to control the position of the throttle valve 28 for maintaining the speed of the engine 10 at a predetermined value, a mechanical governor of the fly-ball type, shown generally at 29, may be provided. The governor 29 is provided with a beveled gear 30 which is disposed to engage a corresponding beveled gear 31 secured to and driven by the shaft 11. The governor 29 may be connected by means of a connecting rod 32 to an operating arm 34 which is secured to the throttle valve 28. It will be readily understood that the governor 29 is arranged to maintain the proper opening of the throttle valve 28 so that the speed of the engine 10 will be maintained at a predetermined value.

In order to reduce the speed of the engine, which will normally be maintained at a predetermined value by the governor 29, an idling device, shown generally at 40, is provided. As illustrated in the drawings, the idling device 40 is provided with a connecting rod 41 which is arranged to slidably engage the lower end of the arm 34 and has a spring 42 interposed therebetween, as will be set forth in detail hereinafter.

With a view to controlling the operation of the idling device 40 in accordance with the initiation and termination of the flow of current from the generator 12, a winding 43 is provided which may be connected in series-circuit relation with the welding circuit. It will be understood, however, that the connections shown in the diagram are merely illustrative and that the winding 43 may be connected to be responsive to any variable characteristic of the generator 12, as will be readily understood by those skilled in the art.

The idling device 40 is operated by means of oil pressure which may be obtained from an oil pump 44. The oil pump 44 is provided with a beveled gear 45 which may be arranged to engage the beveled gear 31 as illustrated. An oil pipe 46, of relatively small diameter, is provided for connecting the oil pump 44 to the idling device 40, and has provided therein a valve 47 for controlling the rate of flow of oil through the pipe 46. An exhaust pipe 48, of relatively large diameter, is provided to return the oil from the idling device 40 to the crank case of the engine 10.

Referring now particularly to Fig. 2 of the drawings, it will be observed that the throttle valve 28 is in the closed position. An opening 49 may be provided in the throttle valve 28 to permit sufficient fuel to flow to the engine to maintain it operating at the idling speed, or the throttle valve 28 may be prevented from fully closing, as will be readily understood. It will be observed that the fly-balls 50 of the governor 29 are in the extended position and that the governor spring 51 is correspondingly stressed due to the throttle valve 28 having been operated to the closed position by the idling device 40.

The throttle valve 28 is held in the closed position by means of the idling device 40 which is connected by means of the connecting rod 41 to the lower end of the operating arm 34. As illustrated in the drawings, the idling device 40 comprises a cylinder 52 within which a piston 53 is slidably positioned and secured to the connecting rod 41. A compression spring 54 is provided for biasing the piston 53 to the left.

As has been set forth hereinbefore, the idling device 40 is operated by means of oil pressure which is obtained from the oil pump 44. The oil is admitted to the cylinder 52 through the inlet pipe 46 for the purpose of operating the piston 53 to the position illustrated in Fig. 2 of the drawings. In order to permit the discharge of the oil from the cylinder 52, a valve plunger 55 is provided for closing a relatively large opening 56 from the cylinder 52 to the exhaust pipe 48. An armature 57, which may be integrally formed with the valve portion 55, is positioned within winding 43 in such manner that, on energization thereof, the armature will be drawn into the solenoid and the valve plunger 55 will be moved upwardly to the position illustrated in Fig. 3 of the drawings.

Figure 4:
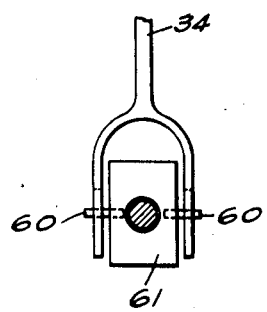
Fig. 4 is a detail view, partly in section, showing the connection of the idling device to the throttle valve.

Since it is desired to place the throttle valve 28 under the control of the idling device 40 only when the load has been removed from the engine, it is desirable to so connect the idling device 40 that it will be ineffective to control the operation of the throttle valve 28 during the time when load is applied to the engine 10. For this purpose, the lower end of the operating arm 34 is bifurcated, as is more clearly shown in Fig. 4 of the drawings, and each of the arms of the bifurcated end of the operating arm 34 is also bifurcated. Pins 60 are positioned in these last-named bifurcations and are secured to a block 61 which is slidably mounted on the connecting rod 41. The spring 42 is secured at one end, as illustrated, to a collar 62 which is fastened to the connecting rod 41, the other end being disposed to engage the block 61 only when the idling device 40 is operated on removal of load from the engine 10.

In operation, assuming that the engine 10 is operating at idling speed, the relative positions of the control mechanisms for adjusting the position of the throttle valve 28 will be as illustrated in Fig. 2 of the drawings. The governor 29 will be attempting to open the throttle valve 28 but it will be prevented from so doing and the throttle valve 28 will be held in the closed position by means of the idling device 40, only sufficient fuel being permitted to flow to operate the engine 10 at the idling speed. As soon as the welding electrode 18 is caused to engage the work 19, current is supplied from the generator 12 through the winding 43 of the idling device 40. The current flow through the winding 43 generates a magnetic field which attracts the armature 57 and lifts the valve plunger 55 from its seat, thereby opening the passage 56 to the exhaust pipe 48.

The opening 56 and exhaust pipe 48 are relatively large in diameter and the oil in the cylinder 52 will be rapidly expelled therefrom, as the piston 53 is biased to the left by means of the spring 54. Since the oil is expelled substantially instantaneously after the load is applied to the engine, the throttle valve 28 will be immediately placed under the control of the governor 29 and it will thence forth take control of it as long as load is applied to the engine 10.

Figure 3:
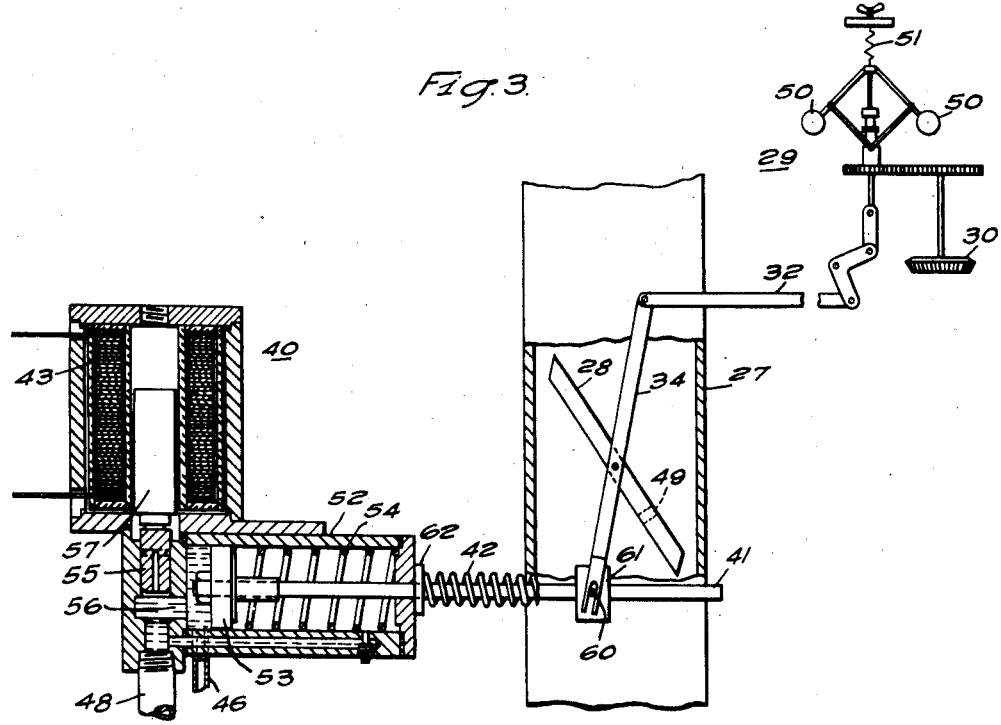
Fig. 3 is a view similar to Fig. 2 showing a different operating position.

The condition of the governor 29 and the idling device 40, while load is being applied to the engine, is illustrated in Fig. 3 of the drawings. It will be observed that the spring 42 is completely withdrawn from engagement with the block 61, thereby permitting the block 61 to slide freely on the connecting rod 41, as the throttle valve 28 is moved in accordance with the movement of the governor 29, to maintain the position of the throttle valve 28 such that the speed of the engine 10 will be maintained substantially constant as long as the winding 43 continues to be energized.

Oil will continue to flow through the inlet pipe 46 but it will be immediately exhausted through the outlet pipe 48, since the opening 56 is not closed. Since this flow of oil is relatively small, it ordinarily will not be objectionable. However, if so desired, the flow of oil may be cut off while the winding 43 is energized, as is set forth in my aforementioned copending application.

As soon as the welding operation is terminated and welding current ceases to flow through the winding 43, the valve plunger 55 is dropped, thereby closing the opening 56. Oil pressure now gradually builds up within the cylinder 52, forcing the piston 53 to the right to compress the spring 54 at a rate which depends upon the rate at which oil is supplied to the cylinder 52. As has been set forth hereinbefore, this rate may be varied by adjusting the valve 47 in the inlet pipe 46 to regulate the flow of oil therethrough as may be desired.

After the expiration of a certain predetermined time interval, the spring 42 will engage the block 61 and, on being compressed, will gradually overcome the effect of the governor 29 and force the throttle valve 28 to the closed position, as illustrated in Fig. 2 of the drawings, although the governor continually tends to urge it to the open position. The throttle valve 28 will remain in the idling position until load is again applied to the generator 12 and current again flows through the winding 43. The foregoing cycle of operation will then be repeated.

In the event that the load is applied to the engine 10 before the throttle valve 28 has been completely closed by the idling device 40, the control of the throttle valve 28 will be immediately restored to the governor 29 and the idling device 40 will be inoperative to effect a further closure of the throttle valve 28. It is, therefore, unnecessary to complete a cycle of operation of the idling device 40 since it may be interrupted at any instant.

Under certain conditions it may be desirable to control the operation of the throttle valve 28 indirectly through controlling the operation of the governor 29, rather than to control it directly, as has been illustrated and described hereinbefore. This control may be effected by changing, by means of the idling device 40, the speed which is maintained by the governor 29 in accordance with the load driven by the engine 10. The embodiment of the invention illustrated in Figs. 5 and 6 of the drawings may be used for effecting this type of control and reference will now be specifically made to these figures.

The governor 29 is connected by means of the connecting rod 32 to an operating lever 65 which is connected to the throttle valve 28 but which is not provided with the bifurcated lower end as is the operating lever 34. It will be apparent that this connection is that which is customarily used on standard governor control systems and which are ordinarily provided with engines which may be obtained on the open market.

In this modification of the invention the governor 29 is illustrated as being provided with a governor spring 66 of the compression type which is disposed to cooperate with the fly-balls 50 in the control of the throttle valve 28.

As illustrated in the drawings, the compression spring 66 is disposed between a suitable seat 67 which is attached to a lower link 68 of the governor 29 and a corresponding seat 69 which is carried by means of a bell crank 70, pivoted at 71, and attached to the connecting rod 41. In order to limit the movement of the bell crank 70 in either direction in order to adjust the maximum and minimum speeds which will be maintained by the governor 29, adjusting screws 72 and 73 are provided in a suitable frame 74.

Figure 5:
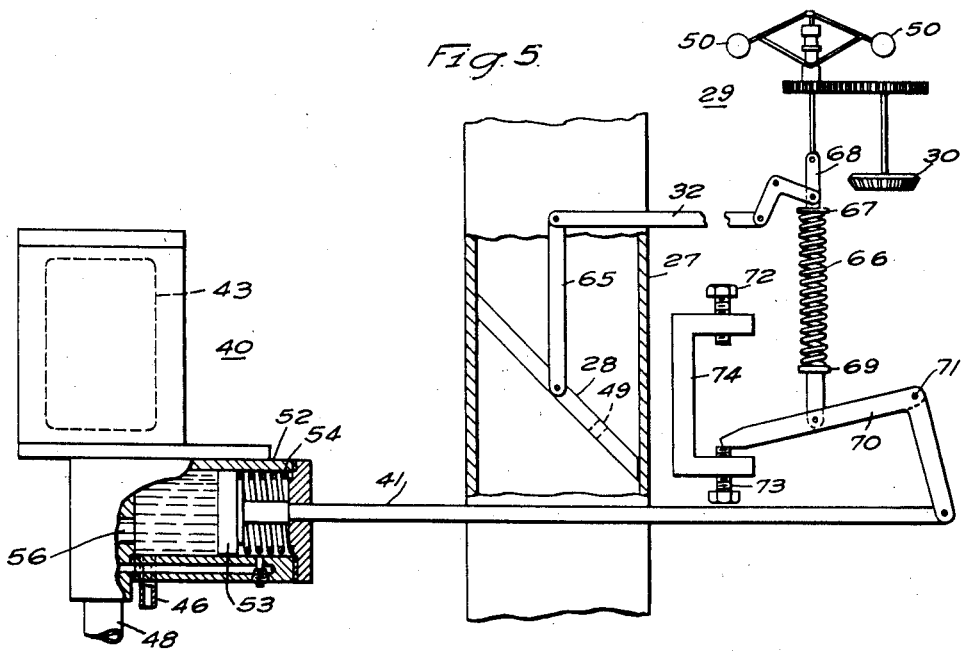
Figs. 5 and 6 show different operating positions of another embodiment of my invention.
Figure 6:
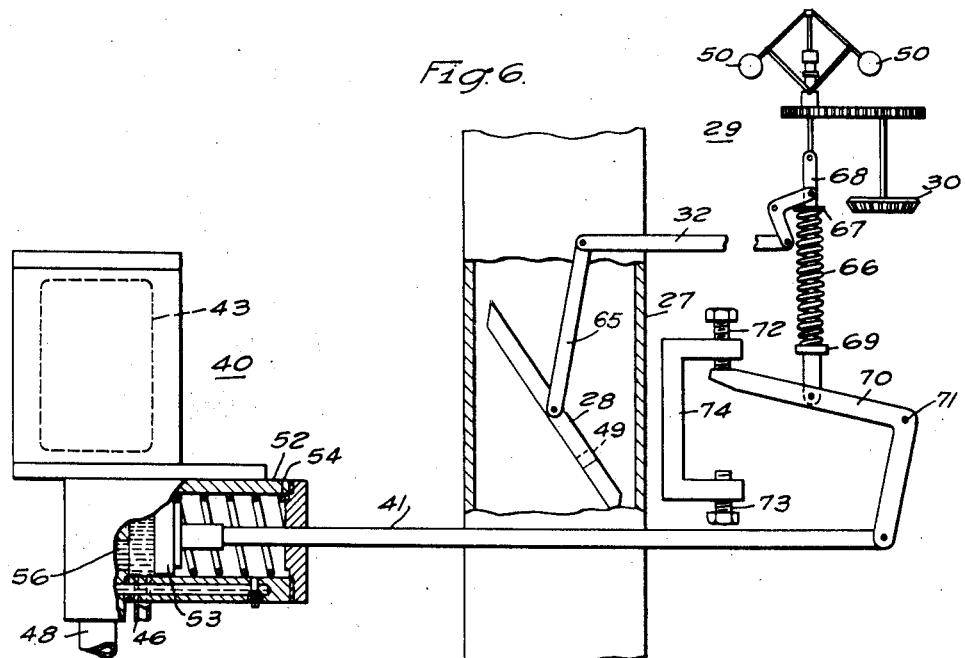

In operation, assuming that the engine 10 is operating at idling speed, the position of the control apparatus will be as illustrated in Fig. 5 of the drawings. The compression force applied to the spring 66 will be a minimum and the fly-balls 50 of the governor 29 will be in the position illustrated with the throttle valve 28 in the closed position.

As soon as the welding circuit is completed by placing the welding electrode in contact engagement with the work 19, current will flow through the winding 43, causing the valve mechanism hereinbefore described, to be opened and the oil within the cylinder 52 will be substantially instantaneously exhausted through the opening 56 as the piston 53 is moved to the left under the influence of the spring 54. An increased compressive force will then be applied to the spring 66, with the result that the force exerted by the combined effect of the fly-balls 50 and the spring 66 will be such as to open the throttle valve 28 and to maintain the speed of the engine 10 at a corresponding operating speed. If the compressive stress transmitted by the spring 66 is increased as by moving the adjusting screw 72 upwardly, it will be understood that a higher operating speed will be maintained. In like manner, a correspondingly lower operating speed will be maintained if the adjusting screw 72 is moved downwardly.

As soon as the load is removed from the engine 10, as for instance when the welding operation is terminated, winding 43 will be deenergized and the opening 56 will be closed by the valve plunger 55. The cylinder 52 will then be gradually filled with oil from the oil pump 44 and the piston 53 will be gradually forced to the right until the position illustrated in Fig. 5 is reached. The combined effect of the fly-balls 50 and the compression spring 66 will then be such as to maintain the speed of the engine 10 at a correspondingly lower or idling speed. Different idling speeds may be obtained by adjusting the position of the adjusting screw 73.

It will be observed in this embodiment of the invention that the idling device 40 is arranged to automatically change the speed, which will be maintained by the governor 29 in a manner which corresponds to the manual adjustments which are effected to cause a corresponding change in speed. While the spring 66 has been described as being a compression spring, it will be readily apparent that the principle of operation described hereinbefore will be equally applicable if a tension spring were used.

Since certain further changes may be made in the above construction and different embodiments of the invention may be made without departing from the scope thereof, it is intended that all matter contained in the above description or shown in the accompanying drawings shall be interpreted as illustrative and not in a limiting sense.

I claim as my invention:

1. Speed-control apparatus for an internal-combustion engine connected to drive an electric generator for supplying current to a welding circuit or the like comprising, in combination, a fuel inlet pipe to the engine, a throttle valve in the fuel inlet pipe for controlling the flow of fuel to the engine, a governor operatively connected to said throttle valve for regulating the flow of fuel in accordance with the speed of the engine to maintain a predetermined speed, and idling means responsive to the termination of flow of welding current for effecting the closure of said throttle valve to permit only sufficient fuel to flow to operate the engine at idling speed.

2. Speed-control apparatus for an internal-combustion engine connected to drive an electric generator for supplying current to a welding circuit or the like, comprising, in combination, a fuel inlet pipe to the engine, a single throttle valve in the fuel inlet pipe for controlling the flow of fuel to the engine, means connected to said single throttle valve for regulating the flow of fuel in accordance with the speed of the engine to maintain the speed thereof within a predetermined range of operating speed, and additional means also connected to said single throttle valve and responsive to a variable characteristic of the output of the generator for closing said single throttle valve to operate the engine at idling speed on termination of flow of welding current.

3. Speed-control apparatus for an internal-combustion engine connected to drive an electric generator for supplying current to a welding circuit or the like comprising, in combination, a fuel inlet pipe to the engine, a single throttle valve in the fuel inlet pipe for controlling the flow of fuel to the engine, a governor operatively connected to said single throttle valve for regulating the flow of fuel in accordance with the speed of the engine to maintain a predetermined speed, and idling means responsive to the termination of flow of welding current for effecting the closure of said single throttle valve, after the expiration of a predetermined time interval, to operate the engine at idling speed.

4. Speed-control apparatus for an internal-combustion engine connected to drive an electric generator for supplying current to a welding circuit or the like comprising, in combination, a fuel pipe to the engine, a single throttle valve in the fuel inlet pipe for controlling the flow of fuel to the engine, means connected to said single throttle valve for regulating the flow of fuel in accordance with the speed of the engine to maintain the speed thereof within a predetermined range, and additional means also connected to said single throttle valve and responsive to a variable characteristic of the output of the generator for closing said single throttle valve after the expiration of a predetermined time interval, to operate the engine at idling speed on termination of flow of welding current.

5. Speed-control apparatus for an internal-combustion engine connected to drive an electric generator for supplying current to a welding circuit or the like comprising, in combination, a fuel inlet pipe to the engine, a single throttle valve in the fuel inlet pipe for controlling the flow of fuel to the engine, a governor driven by the engine and operatively connected to said single throttle valve for regulating the flow of fuel to maintain the speed of the engine within a predetermined range, and idling means responsive to the termination of flow of welding current for overcoming the effect of said governor to close said throttle valve for operating the engine at idling speed.

6. Speed-control apparatus for an internal-combustion engine connected to drive an electric generator for supplying current to a welding circuit or the like comprising, in combination, a fuel inlet pipe to the engine, a single throttle valve in the fuel inlet pipe for controlling the flow of fuel to the engine, a governor driven by the engine and operatively connected to said single throttle valve for regulating the flow of fuel to maintain the speed of the engine within a predetermined range and idling means responsive to the termination of flow of welding current for overcoming the effect of said governor to close said throttle valve, after the expiration of a predetermined time interval, for operating the engine at idling speed.

7. Speed-control apparatus for an internal-combustion engine comprising, in combination, a fuel inlet pipe to the engine, a single throttle valve in the fuel inlet pipe for controlling the flow of fuel to the engine, a governor driven by the engine and operatively connected to said single throttle valve for regulating the flow of fuel to maintain the speed of the engine within a predetermined range, fluid-pressure means also operatively connected to said single throttle valve, and control means responsive to a variable characteristic of the load driven by the engine for controlling the operation of the fluid-pressure means to close said single throttle valve, on removal of load from the engine, thereby permitting only sufficient fuel to flow to operate the engine at idling speed.

8. Speed-control apparatus for an internal-combustion engine comprising, in combination, a fuel inlet pipe to the engine, a single throttle valve in the fuel inlet pipe for controlling the flow of fuel to the engine, a governor driven by the engine and operatively connected to said single throttle valve for regulating the flow of fuel to maintain the speed of the engine within a predetermined range, fluid-pressure means operatively connected to said governor, and control means responsive to a variable characteristic of the load driven by the engine for controlling the operation of the fluid-pressure means to release the throttle valve from the control of the governor and to close said throttle valve after the expiration of a predetermined time interval after the load is removed from the engine to permit only sufficient fuel to flow to operate the engine at idling speed and to restore said single throttle valve to the control of said governor substantially instantaneously after the load is applied to the engine.

9. Speed-control apparatus for an internal-combustion engine connected to drive an electric generator for supplying current to a welding circuit or the like comprising, in combination, a fuel inlet pipe to the engine, a single throttle valve in the fuel inlet pipe for controlling the flow of fuel to the engine, a governor driven by the engine and operatively connected to said single throttle valve for regulating the flow of fuel to maintain the speed of the engine within a predetermined range, fluid pressure means disposed to be operatively connected to said single throttle valve but ineffective to control the operation thereof when load is applied to the generator, and control means responsive to the initiation and termination of flow of welding current for controlling the operation of the fluid pressure means to effect the closure of said single throttle valve at the expiration of a predetermined time interval after the termination of current flow, thereby permitting only sufficient fuel to flow to operate the engine at idling speed and to effect the opening of said single throttle valve substantially instantaneously after the initiation of current flow.

10. Speed-control apparatus for an internal-combustion engine comprising, in combination, a fuel inlet pipe to the engine, a single throttle valve in the fuel inlet pipe for controlling the flow of fuel to the engine, a governor driven by the engine and operatively connected to said single throtle valve for regulating the flow of fuel to maintain the speed of the engine within a predetermined range, fluid-pressure means disposed o be operatively connected to said single throttle valve for effecting the movement thereof from and to an idling-speed position, a valve mechanism for controlling the flow of the fluid, said valve mechanism being effective to permit the admittance of the fluid to the fluid-pressure means at a relatively slow rate and to permit the discharge of the fluid therefrom at a relatively fast rate, and control means responsive to a variable characteristic of the load driven by the engine for effecting the operation of the valve mechanism, whereby the throttle valve is moved relatively quickly from the idling-speed position to the full-speed position on application of load to the engine and relatively slowly from the full-speed position to the idling-speed position after load is removed from the engine.

11. Speed-control apparatus for an internal-combustion engine connected to drive an electric generator comprising, in combination, a throttle valve for controlling the flow of fuel to the engine, oil-pressure means operatively connected to the throttle valve for controlling its operation, a source of oil pressure connected to continually supply oil to said oil-pressure means, valve means for effecting the discharge of the oil from said oil-pressure means at a relatively fast rate, and electrical control means connected to be responsive to a variable characteristic of the output of the generator for controlling the operation of said valve means.

12. Speed-control apparatus for an internal-combustion engine connected to drive an electric generator comprising, in combination, a throttle valve for controlling the flow of fuel to the engine, a cylinder provided with a relatively large exhaust port, a piston slidably disposed within said cylinder, means for operatively connecting the piston to the throttle valve, resilient means for biasing the throttle valve to the open position, a source of oil pressure connected to continually supply oil to said cylinder at a relatively slow rate, a valve adapted to close said exhaust port to permit oil to fill said cylinder and thereby operate said piston to close said throttle valve, and control means connected to be responsive to the output of said generator for opening said valve on application of load to permit the rapid exhaustion of oil from said cylinder and for closing said valve on removal of load.

13. Speed-control apparatus for an internal-combustion engine connected to drive an electric generator connected to supply current to a welding circuit or the like comprising, in combination, a fuel inlet pipe to the engine, a throttle valve in the fuel inlet pipe for controlling the flow of fuel to the engine, a governor operatively connected to said throttle valve for regulating the flow of fuel in accordance with the speed of the engine to maintain a predetermined speed, spring means in said governor for controlling the operation thereof, and idling means responsive to the initiation and termination of current flow in the welding circuit for varying the biasing force of said spring means, thereby changing the engine speed maintained by the governor.

14. Speed-control apparatus for an internal-combustion engine connected to drive an electric generator connected to supply current to a welding circuit or the like comprising, in combination, a fuel inlet pipe to the engine, a throttle valve in the fuel inlet pipe for controlling the flow of fuel to the engine, a governor operatively connected to said throttle valve for regulating the flow of fuel in accordance with the speed of the engine to maintain a predetermined speed, spring means in said governor for controlling the operation thereof, and means responsive to variations in a characteristic of the output of the generator for varying the biasing force of said spring means, thereby changing the engine speed maintained by the governor.

JOHN H. BLANKENBUEHLER.